United States Patent [19]

Cerf

[11] Patent Number: 4,653,882
[45] Date of Patent: Mar. 31, 1987

[54] DEVICE FOR EXPOSING DISCRETE PORTIONS OF A PHOTOSENSITIVE SURFACE BY MEANS OF A LIGHT BEAM

[75] Inventor: Roland Cerf, Vessy, Switzerland

[73] Assignee: EIE Electronic Industrial Equipment S.A., Switzerland

[21] Appl. No.: 835,041

[22] Filed: Feb. 28, 1986

[30] Foreign Application Priority Data

Mar. 4, 1985 [CH] Switzerland .......................... 964/85

[51] Int. Cl.4 ............................................. G03B 41/00
[52] U.S. Cl. ......................................................... 354/4
[58] Field of Search ..................................... 354/4, 15

[56] References Cited

U.S. PATENT DOCUMENTS

| 3,330,182 | 7/1967 | Gerber et al. | 354/4 |
| 3,686,675 | 8/1972 | Faul et al. | 354/4 X |
| 3,721,164 | 3/1973 | Kuttigen et al. | 354/4 |
| 4,465,350 | 8/1984 | Westerberg | 354/4 |

Primary Examiner—Donald A. Griffin

[57] ABSTRACT

The device comprises a lamp which directs a light beam to a photosensitive surface through symbols contained on a rotating disc, along a straight axis without changement of direction, the distance between the lamp and the sensitive surface being maintained constant. The device further comprises an enlarging objective movable along the optical axis and allowing to vary continuously the size of the projection of the symbols between two limits, namely between about 0.5 and 1.5 times the normal size of the symbols.

16 Claims, 4 Drawing Figures

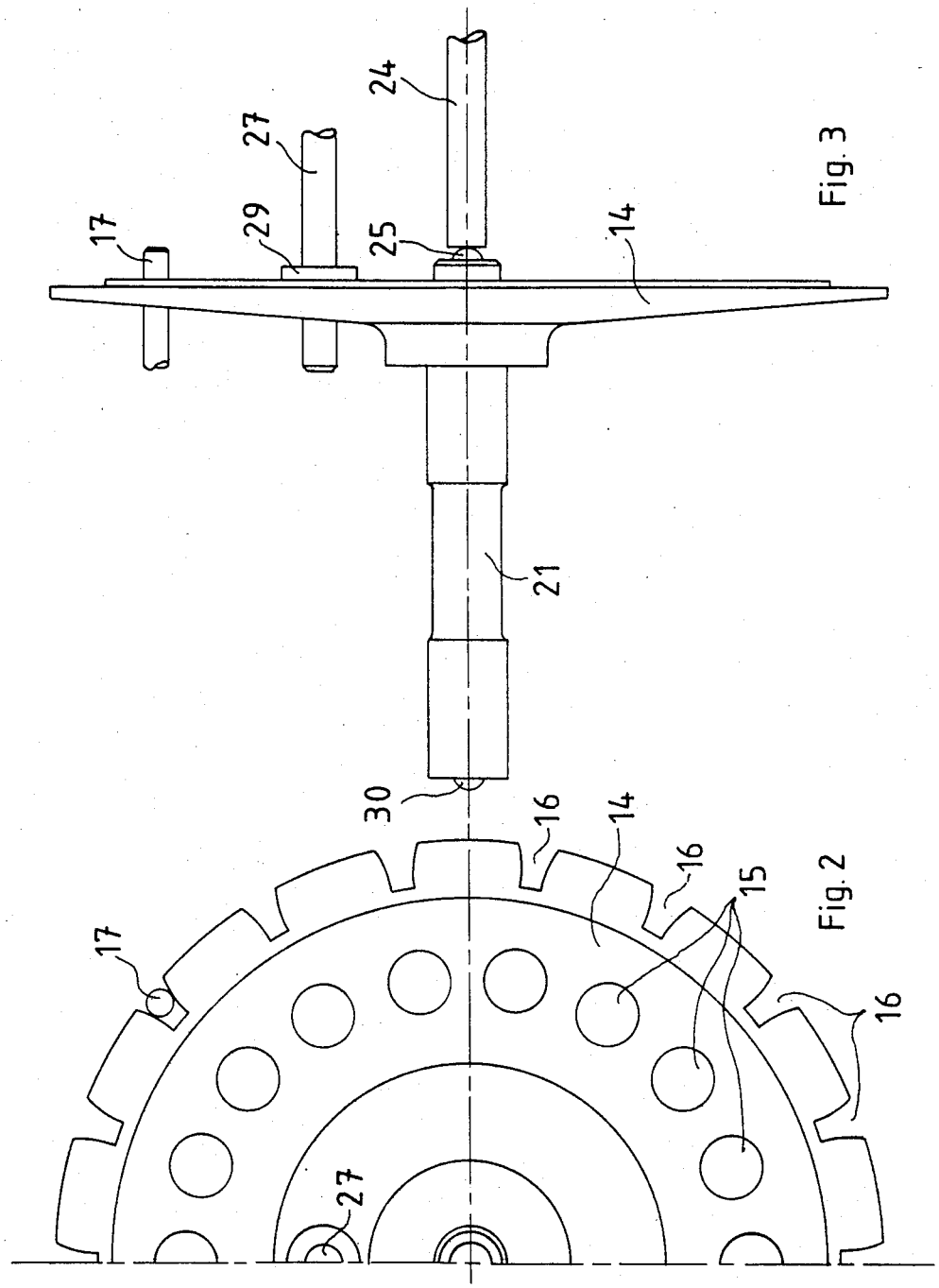

DEVICE FOR EXPOSING DISCRETE PORTIONS OF A PHOTOSENSITIVE SURFACE BY MEANS OF A LIGHT BEAM

BACKGROUND OF THE INVENTION

The present invention relates to a device for making exposures on discrete portions of a photosensitive surface by means of a light beam, of the kind wherein a support arranged to carry the photosensitive surface, an optical head arranged to direct and to control the light beam emerging from a lamp, traversing symbols in the form of masks distributed on a rotating disc, and travelling further towards said sensitive surface, and means for the mounting and the displacement of the optical head or of the sensitive surface, or of both, are provided.

Devices and apparatuses allowing the exposure of discrete or selected portions of a photosensitive surface, by means of a light beam, are typically used in architecture, in cartography, in the field of topography, etc. These devices actually allow the realization of plans in the just mentioned fields with the aid of information and data stored in a computer. Besides in the cited fields, these devices are also used to carry out plans of machine parts in mechanics starting from coded information stored in a computer. An important and well-known use of such devices is the realization of printed circuits. Such devices are then called photoplotters. Known photoplotters generally comprise a numerically controlled drawing machine wherein a relative movement between the drawing support and a drawing tool is generated according to a coordinate system X-Y. The displacements of the drawing tool are automatically generated by commands, namely date supplied e.g. by a computer. Generally, the drawing tool is a luminous drawing head mounted on the machine. In this case, the drawing support is a photosensitive surface whereupon a light beam is projected. This light beam may traverse certain symbols which are then projected when the machine stops, whereas lines are projected during the displacing movement of the luminous head relative to the sensitive surface. The choice of the symbols and the width of the traced lines, as well as the control of the light intensity of the beam, are automatic.

Presently, several types of photoplotters with luminous heads are available. British patent No. 1,107,981 discloses a device for automatically tracing a line in function of stored date, this device comprising two wagons or equipments which are movable with respect to each other and are moved in the X and Y directions by two servo motors in function of stored date. The movable equipments carry a luminous source to project a luminous pencil onto a photosensitive surface. The apparatus further comprises a diaphragm having a variable opening to act on the dimensions of the image of the light beam, and a prism to rotate the image around an axis comprised in the flux of the light beam. This allows a projected image to be maintained in a preferred orientation relative to the direction of the trace.

French Patent Specification No. 2,061,081 describes an apparatus for the automatic tracing of lines in function of stored data, comprising the coordinates of the points of the lines to be traced, expressed by reference to standard axes. This apparatus is destined for being used in the field of cartography and comprises a light source, means for projecting a light beam on a photosensitive surface, and a diaphragm with a variable opening in the flux of the light beam for controlling the image dimensions. It further comprises movable means variable in function of data, for automatically displacing said light beam and producing the trace of a line to be projected on the photosensitive surface, and means for maintaining the exposition of said trace on the photosensitive surface, at a preset value.

Similar devices and apparatuses are also disclosed in the British Patent Specification No. 1,267,824, French Patent Specification No. 2,098,005, and U.S. Pat. No. 3,330,182.

All these known devices generally comprise relatively complicated optical heads, containing diaphragms, numerous films, prism or mirrors in order to deflect the light beam, and devices for controlling the intensity, the sharpness etc. thus rendering the function of such heads not very certain and, above all, rather slow.

SUMMARY OF THE INVENTION

The first and major object of the invention is to avoid the disadvantages of the already disclosed photo-plotter devices and apparatuses and to provide a new and useful device of the nature defined at the beginning of this disclosure.

Another object of the invention is to provide an optical head wherein there is an objective which is movable along the optical axis of the head, thus allowing to reduce or enlarge at will symbols to be reproduced on the film.

Still another object of the invention is to provide within an optical head, principally to be used in photoplotters, a magazine for the fully or semi automatic projections of symbols of any alphanumerical kind, on the surface of said photosensitive film.

These objects and still others are now attained by the present invention of a device wherein an objective is mounted in the optical path between the said mask bearing disc and the said sensitive surface, said objective being arranged to be moved between two limits in the path of said light beam, that said mask bearing disc is arranged to be moved too between two limits, in a parallel direction to the said light beam, a mechanism being provided to generate a displacement of said disc relative to said objective, according to an algorithm allowing the continuous obtention of an enlargement or an adjusted reduction of the projection of said symbols which are determined by said mask, on said sensitive surface.

The said mechanism preferably comprises a cam driven by the displacement of the objective, the cam pushing the shaft of the disc against the action of a spring, and thus displaces the disc according to the algorithm which defines the relative movement between the disc and the objective.

The moving of the objective which is mounted between the disc and the sensitive surface, may be effected by means of the rotation of a screw in a nut-forming plate which retains the objective, controlled by a stepping motor, said threaded nut plate having a pin whereon the cam surface presses, said surface being machined in such a way as to respond to the adjusting algorithm of the rotating disc position.

The objective and the disc may be driven by stepping motors, and said algorithm may be programmed in a microprocessor.

The rotating mask bearing disc where the masks are executed to supply the symbols to be reproduced, may be driven by a stepping motor, said disc having a plurality of notches regularly spaced over its periphery, every notch being provided past a boring (seen from the center of the disc) wherein a mask which shows a symbol is placed. After rotation, the disc is blocked in a predetermined position, corresponding to a particular symbol, by a pin pushed into the notch by means of a cam which is loaded by a spring, said cam being connected to an eccentric driven by a stepping motor.

A shutter having the shape of a blade or a leaf, may be placed directly after the lamp, said shutter being driven by another stepping motor.

A photoelectric cell may be inserted adjacent to the lamp and will supply a reference voltage which can be used to control the luminous intensity of said lamp.

In a preferred embodiment, the rotating disc which carries the symbols, its positioning device, the objective, the positioning cam, and the corresponding stepping motors are enclosed in a housing having a rigid, precision machined support, and connected to the mounting and moving means of the optical head, by the intermediate of pre-adjusted stop means. On the other hand, the lamp, the shutter and a condensor are enclosed in a separate block surmounted by a heat diffusor, and connected to the support by a hinge. The symbol carrying disc is mounted between the said housing and the lamp containing block, the disc shaft being introduced into a boring of the housing to come into contact with the cam driven by the objective, the disc and its shaft being arranged to be removed from the housing when the lamp block is moved away from the housing by a rotation about its hinge, the driving of the disc being effected by an eccentric pin entering in a boring of the disc and mounted on a wheel which is driven by a stepping motor, said wheel and its motor being mounted into the lamp block, and the disc and its shaft being pressed against the objective cam by a central rod placed under the action of a spring and also mounted in the lamp block.

The objective may be a simple enlarging objective.

Still according to the preferred embodiment of the device of this invention, the optical head has a size which enables it to be placed into a cube having a side length of about 14 cm, and the length of the light beam between the lamp and the sensitive surface does not exceed about 10.5 cm. On the other hand, the beam is a straight one without any change of direction.

The sensitive surface may be exposed on the surface of a rotating drum, the optical head being mounted adjacent to this drum and arranged to move along a generating line of the drum.

According to a variant of this embodiment, the sensitive surface may be a plane face, and the optical head is then arranged to move in parallel to this plane along the two main directions X and Y.

According to still another variant of this embodiment, the sensitive surface may be a plane one, and the optical head is in this case arranged to move adjacent to this plane in the X direction, the table having the ability to move in the perpendicular direction to allow the positioning in the Y axis.

BRIEF DESCRIPTION OF THE DRAWING

Therefore, the invention will be more completely understood from the detailed description of practical embodiments thereof, given hereinafter and the accompanying drawing, which are given by way of example and illustration only and thus are not limitative of the present invention.

In the drawing,

FIG. 2 is a frontal half-view of the rotating disc comprising the symbol defining masks;

FIG. 3 is a side view of the disc shown in FIG. 2, with its shaft, its blocking and driving pin, and the rod which pushes the disc and its shaft against the cam under the action of a spring, said cam being driven in relation with the displacement of the objective.

Figure 1:
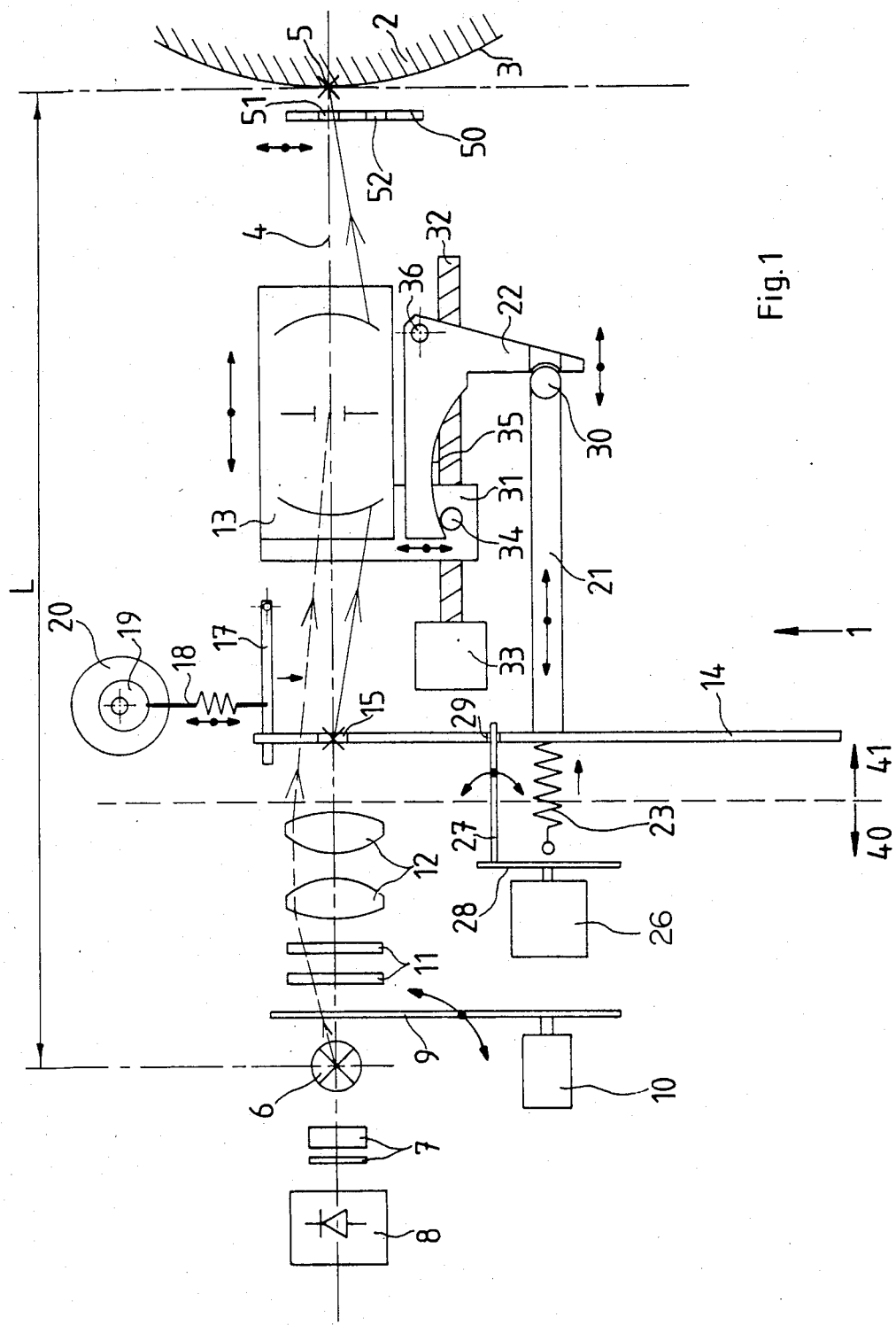
FIG. 1 is a schematic side elevational view of the path of the light beam within the optical head, from the lamp until the sensitive surface, the components of the optical head being only schematically shown.

The device shown in FIG. 1 of the drawing comprises an optical head 1, showing in a schematic manner all its constituant elements, and at its right a drum 2 whose mantle carries a sensitive surface 3, typically the photosensitive layer of a photographic film. The optical head 1 has an optical axis 4 which intersects the main axis (not shown) of the film carrying cylindrical drum 2. This drum 2 is mounted in a housing (not shown) of the device in a rotative manner about said main axis. The drum 2 will be controlled by an appropriate device (not shown) which will start and stop the rotation thereof at predetermined positions. The optical head is mounted on a device (not shown) allowing the displacement of the head along the generating line 5 of the mantle of the cylinder 2. This movement will be effected with the aid of an appropriate device (not shown) which will move forwardly and rearwardly said head along said generating line 5, and which will be able to stop said head at a predeterminated position.

The optical head 1 comprises on the optical axis 4, an incandescent lamp 6 which acts as a light source for the optical head 1. This incandescent lamp is a tungsten halogen lamp whose intensity may be changed in order to adapt to the sensitivity of the film 3 in function of the selected symbols. At the left of the lamp, on the optical axis 4, are mounted filters 7 and a photoelectric cell 8. The cell 8 is adapted to measure the luminous flux of the lamp 6 and to control it to a predetermined value, that predetermined or standard value depending upon the enlargement of the symbols to be projected, the displacement speed of the head 1 relative to the drum 2, the rotational speed of the drum, the film sensitivity, etc. The filters 7 serve to adapt the spectral sensitivity of the cell 8 to that of the film 3. The cell 8 thus supplies a reference potential which will be used to control the supply of the lamp 6 as a function of the symbols to be sensitized on the film 3.

On the other side of the lamp 6, seen from the cell 8, is mounted a shutter blade 9 liberating or interrupting the light beam at the right of the lamp. The shutter blade 9 is controlled by a stepping motor 10. On the optical axis 4 are successively mounted, behind the shutter 9, two filters 11 of the compensation of the useful wavelengths, namely for the determination of the useful optical spectrum. Two condensors 12 are positioned after the filters 11 and serve to condense the luminous flux from the lamp 6 onto an objective 13. A disc 14 is inserted between the condensors 12 and the objective 13, having on its periphery regularly spaced borings 15 for receiving masks which define the symbols to be projected onto the film 3 (see also FIGS. 2 and 3). The outer periphery of the disc 14 is fitted, past each boring 15, with corresponding V-shaped notches 16 for positioning the disc 14 relative to the axis 4 by means of a positioning pin 17. This pin 17 is brought into the notch 16 by means of spring rod 18 which is pivotally mounted on an eccentric 19 which is rotated by a stepping motor 20 (FIG. 1). The positioning pin 17 is thus pushed into a notch 16 by the spring rod 18 when the eccentric 19 gets into the position shown in FIG. 1, and this guarantees an absolutely play-free positioning by the pushing force of the pin 17 into the notch 16, which force is weak and constant and thus avoids any wear of the notches 16.

The disc 14 further comprises a shaft 21 (FIGS. 1, 2, 3) which is rotatively and slidingly mounted in the housing (not shown) of the optical head 1. The disc 14 and its shaft 21 are pressed against a cam 22 by the force of a spring 23 (FIG. 1) and a pushing rod 24 (FIG. 3). The pushing rod 24 is not shown in FIG. 1 where the elements of the optical head are represented in a mere schematical manner. On the other hand, the pushing rod 24 which takes rest on a sphere 25 in the center of the disc 14, is shown in detail in FIG. 3. The disc 14 (FIG. 1) is rotated and stopped in a predetermined position in function of the symbol to be projected, by means of a stepping motor 26 rotating via a toothed gear a finger 27 mounted on a plate 28 solidly fixed to the driving shaft of the stepping motor 26. The finger 27 projects into a boring 29 made in the disc 14 (see also FIGS. 2 and 3). The free end of the shaft 21 of the disc 14 is fitted with a sphere 30 for pushing the cam 22, and this will be explained later.

After having traversed the boring 15 which contains a symbol, the light beam enters the objective 13 mounted on the threaded plate 31 which can be laterally moved by a screw 32 being the driving shaft of a stepping motor 33. The objective 13 is an enlarging objective of a relatively simple concept. The objective serves to enlarge and to reduce the size of the projection of the symbols which are contained in the borings 15, on the sensitive surface of the film 3, this function being realized when the objective 13 is moved along the optical axis 4 by means of the screw 32. The threaded plate 31 is fitted with a pin 34 contacted by a surface 35 of a cam 22 which is mounted pivotally around a solid axis 36. The machined surface 25 of the cam 22 is executed according to an algorithm which is calculated in such a manner as to sharply produce on the film 3 the projection of symbols determined by the masks contained in the borings 15 of the disc 14 when the enlargement of these symbols is changed. It should be noted here that the objective 13 is calculated in such a manner that the projection of said symbols may be varied in continuous manner between two limits being comprised within 0.5 and 1.5 times the size of these symbols.

The symbols are realized on films placed in the borings 15 of the disc 14. These symbols are perfectly well known to the man skilled in the art and are therefore not described in detail. The projection of the symbols may be effected in two manners:
(a) by "flashes", the optical head being stopped and the shutter opens and closes on a predeterminated symbol so that to project it during a predeterminated lapse of time on the sensitive surface of the film 3.
(b) by traces where the optical head and the drum 2 are moving, the shutter being open, the luminous flux being selected in function of the relative moving speed of the drum 2 and the head, as well as in function of the particular symbol.

According to a variant which is not shown, the relative movement of the disc and the objective according to said algorithm may be obtained by means of two stepping motors which operate the moving of the objective and that of the disc. These stepping motors would then be controlled by a microprocessor wherein said algorithm would be programmed.

It is evident from FIG. 1 that the luminous source 6 and the image plane on the generating line 5 of a drum 2 are at a fixed and constant distance L. This distance is determined once and for all times in the optical head and will never vary. This distance is about 10.5 cm in a preferred embodiment of the instant device. The one skilled in the art will therefore notice that this distance L is short, and that there are within the path of the luminous flux neither diaphragm nor prism nor change of direction. The luminous flux is straight from the lamp to the sensitive surface 3. The symbols being relatively small, there is therefore a great luminosity which allows the optical head to work with great speed. On the other hand, the fact that the luminous flux is straight allows to avoid all reflection and any defect during the projection of the symbols.

The geometry of the objective 13 has been calculated so that the symbols which are present in the form of diapositives, can be projected with a great sharpness on the film 3 by an image reduction with a factor of about 1 to 2, and by an enlargement of the image (symbol) also with an approximative factor of 1.5 to 2, the size reduction and enlargement being continuous. The projected image of each symbol may therefore be changed starting from less than the half of the symbol diameter, continuously until twice the diameter of the symbol, which gives a continuously variable relation of 3 times. In order to fulfill these conditions, it is necessary to move according to a defined algorithm the disc 14 which carries the symbol containing diapositives, relative to the objective 13. In order to realize this algorithm, the objective is moved parallel to the optical axes by the screw 32 and the threaded plate 31, the screw being driven by a stepping motor 33. The nut 31 which drives the objective 13 carries the pin 34 which pushes on the cam 22. The cam, in turn, pushes the shaft 21 of the disc 14 in function of the calculated algorithm. The spring 23 guarantees that the disc is steadily loaded by the cam 22. The position of the objective 13 which is driven by the stepping motor 33 is defined by a control computer (not shown) of the plotter unit. This computer also controls all other functions realized by the optical head, namely the stepping motors, the choice of the symbols, etc.

The disc 14 and its shaft 21 are pushed by the spring 23 against a cam 22. The rotation of the disc 14 which allows a choice of the symbols to be projected, is controlled by the stepping motor 26. The precise positioning of the disc 14 is then realized due to the stepping motor 20 which will block the disc 14 in its precise position with the aid of the pin 17 entering into the notch 16.

Figure 4:
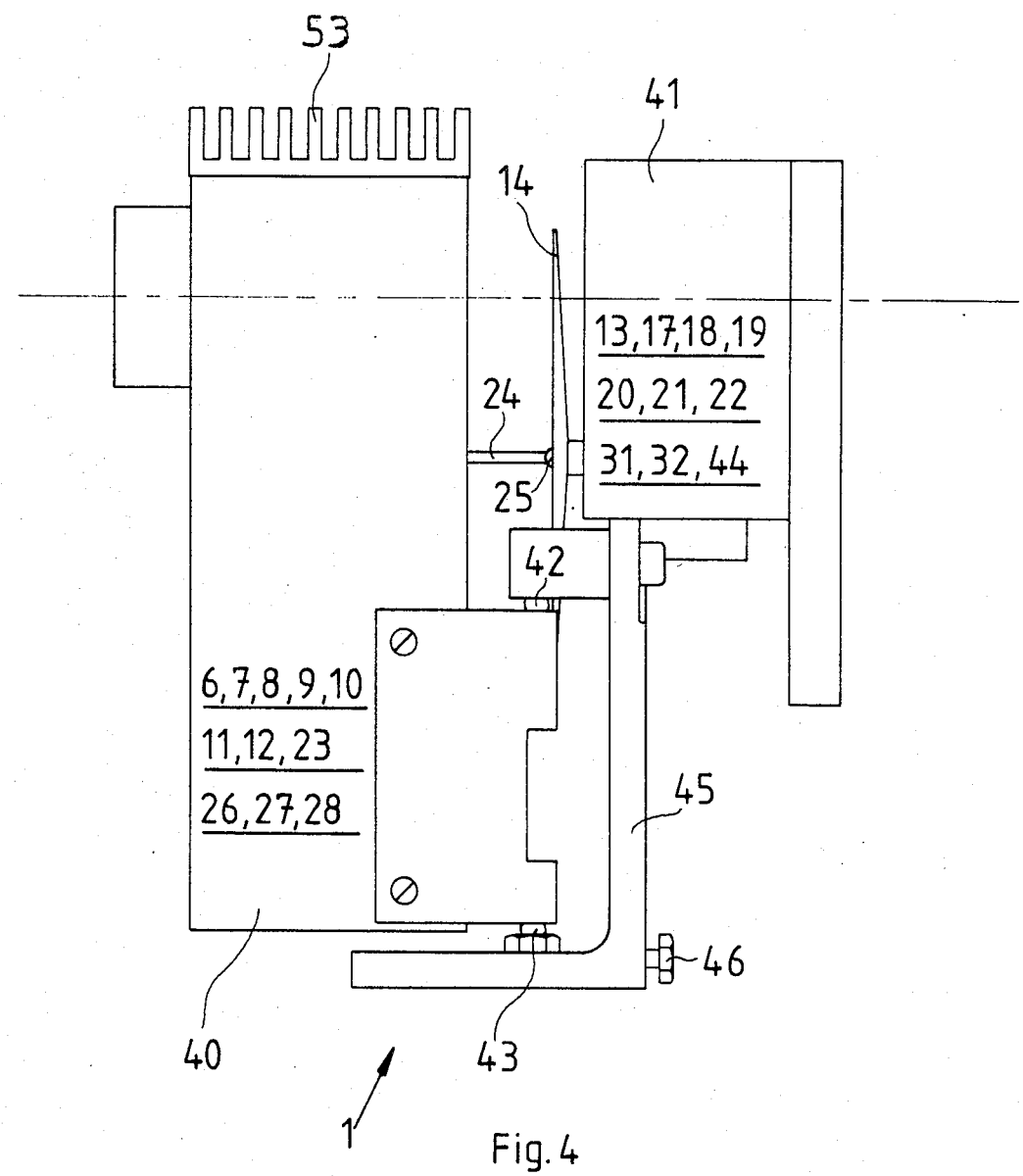
FIG. 4 is a side view of the optical head showing its mounting support and its hinge.

As it is shown in the FIGS. 1 and 4, the optical head 1 is constructed in two fully distinct portions 40 and 41. The portion 40 comprises the halogen lamp 6, the filters 7 and the photoelectric cell 8 as well as the shutter 9 and its stepping motor, the filters 11, the condensors 12, the stepping motor 26 with its driving device of the disc 14 by means of the rod 27 and the pushing rod 24 which loads the center of the disc 14.

The second portion 41 of the optical head 1 is manufactured in a mechanical viewpoint according to a very precise machining procedure. This second portion 41 is connected to the first portion 40 only by a hinge 42, 43. The portion 41 comprises the shaft 21 of the disc 14, the objective 13 mounted on its threaded plate 31, the screw 32 driven by the stepping motor 33, the cam 22 and the disc positioning device which comprises the elements 17, 18, 19 and 20. This concept allows the thermic isolation of the precise mechanical portion from the lamp portion which produces heat. This disposal allows also to remove without any problem the symbol bearing disc 14 to introduce another disc simply by opening the optical head 1, namely by pivoting the block 40 about the hinges 42 and 43. On pivoting, the whole block 40 and its elements as well as the pushing rod 24 go away from the disc 14 which may then be removed.

All the elements which call for a great mechanical precision, namely the disc 14, the objective, the cam 22 as well as the positioning means 17 to 20 of the disc, are interconnected by a sole heavy steel part of the housing and having all the precise machining surfaces. This part, after adjustment, cannot thus further loose its adjustment, and the precision is thus guaranteed. This part is fixed to a support bracket 45 having the stop blocks 46 which are adjusted during manufacture, in such a manner that the adjustment in the Y direction is the same for all heads. The head 1 can thus be mounted, by means of the support bracket 45 and the stop blocks 46, with precision on the device for driving the head (not shown), and such a head may be replaced at all time by another head, if necessary, without need of any preadjustment. The optical heads are therefore interchangeable on the device, as well as the discs 14, and the user does not need to do any adjustment. This allows a rapid repair in case of emergency.

The thus constructed optical head contains an unit 40 comprising the lamp 6 which may heat and expand without adversaly affecting the function of the optical head. This unit 40 is surmounted by a diffusor 53 in order to remove the heat produced by the lamp.

The unit 41 comprises all precise machined elements and remains at ambiant temperature and, consequently, is not subject to any deformation which could alter the working precision of the optical head.

The optical head 1 finally comprises, as shown in FIG. 1, a piece 50 mounted at the output of the light beam adjacent the drum 2 carrying the sensitive surface 3. This piece 50 allows to place into the light beam antireflecting plane glasses 51 or 52. These plane glasses allow the compensation of the thickness differences of the films used. In fact, there are commercially available two films which have, respectively, a thickness of 0.10 and 0.18 mm. When one of these two commercially available films is selected, the user may do the necessary correction with the aid of the piece 50.

As it has already been mentioned, the optical head is mounted on a device which allows its movement on a generating line of the drum 2 carrying the sensitive surface. As a variant, it is however of course possible to mount the optical head on a wagon capable to be moved according to two directions X and Y. The wagon therefore would allow the moving of the optical head 1 over the sensitive surface which, in this case, would be a place surface, the optical head being moved according to the two directions parallel to the plane of the sensitive surface which would then be totally immobile.

According to another variant, the optical head may be mounted in a fixed manner, and then the sensitive surface would be mounted on a plane wagon which could be moved according to two directions.

It has already been said that the light beam is straight and, therefore, is not subjected to any change in direction. On the other hand, its length has been mentioned to be about 10 cm, and this allows to obtain a high luminosity.

Finally it should be noted that the optical head which has now been described can be placed, in a preferred embodiment thereof, in a cube having a side length of about 14 cm. As it has been already described, its two portions 40 and 41 may be separated from each other in pivoting around the hinges 42 and 43 (FIG. 4) so as all the elements of the two portions are perfectly and easily accessible. Any intervention or adjustment may be made in a very simple manner.

I claim:

1. A device for exposing discrete portions of a photosensitive surface by means of a light beam, comprising a support arranged to carry said photosensitive surface; an optical head arranged to direct and to control a light beam generated by a lamp, through symbols represented by masks which are distributed on a rotating disc, towards the said sensitive surface, and means for mounting and moving said optical head and/or said sensitive surface, characterized by the fact that an objective is inserted between the mask carrying disc and the sensitive surface, said objective being arranged to be moved in the path of said light beam between two limits, that the mask carrying disc is arranged to move too between two limits parallel to said light beam; a mechanism being provided to effect a movement of said disc relative to said objective according to an algorithm allowing to obtain a continuous enlargement or adjusted reduction of the projection on the sensitive surface of the symbols determined by said masks.

2. The device of claim 1 further characterized by the fact that said mechanism comprises a cam driven by said moving of the objective, the cam being arranged to push the shaft of said disc against the action of a spring, thus moving the disc according to said algorithm defining the relative movement between said disc and said objective.

3. The device of claim 1 further characterized by the fact that the moving of said objective placed between the disc and the sensitive surface is realized by means of a screw rotating in a threaded plate retaining the objective and driving by a stepping motor, the threaded plate carrying a pin loaded by the cam surface which is machined in such a manner to respond to the algorithm of the adjustment of the position of the rotating disc.

4. The device according to claim 1 further characterized by the fact that said objective and said disc are driven by stepping motors, and that said algorithm is programmed in a microprocessor.

5. The device according to claim 1 further characterized by the fact that said rotating disc which carries the symbols constituting mask is driven by a stepping motor, said disc having succeeding notches regularly spaced over its periphery, each notch being placed past a corresponding boring wherein is placed a symbol representing mask, said disc being after rotation blocked in a corresponding predetermined position at will of a symbol by a pin pushed into said notch by a rod which is loaded by a spring.

6. The device of claim 1 further characterized by the fact that a shutter which has the shape of a blade, is placed directly after the lamp, said shutter being driven by a stepping motor.

7. The device of claim 6 further characterized by the fact that said disc is placed between said housing and said lamp containing block, its shaft being inserted into a boring in said housing to come into contact with said cam driven by the objective, the disc and its shaft being arranged to be removed from said housing when the lamp block is moved away from the housing by rotation about its hinge, the rotation of the disc being realized by an eccentric pin entering into a boring in the disc and mounted on a wheel driven by a stepping motor, said wheel and said motor being mounted into the lamp block, and said disc and its shaft being pushed against the objective cam by a central rod placed under the action of a spring and mounted also into the lamp block.

8. The device of claim 1 further characterized by the fact that a photoelectric cell is placed near the lamp and generates a reference setting used to control the luminosity of said lamp in function of the parameters of speed and film sensitivity according to a drafting program.

9. The device of claim 1 further characterized by the fact that the symbol carrying rotating disc is enclosed, together with its positioning device, said objective, said disc positioning cam and said corresponding stepping motors, in a housing being part of a precision machined support, said housing being connected by the mounting and the moving of the optical head by means of preadjusted stop blocks, and that said lamp, said shutter and a condensor are placed in a separated block surmounted by a heat diffusor and connected to said support by a hinge.

10. The device of claim 1 further characterized by the fact that at least one anti-reflecting plane glass is placed into the path of the light beam between said objective and said sensitive surface, the plane glass being destined to correct thickness differences of said film.

11. The device of claim 1 further characterized by the fact that the length of the light beam between said lamp and said sensitive surface is about 10 cm, the dimensions of the optical head being comprised within a cube having a side length of about 14 cm.

12. The device of claim 1 further characterized by the fact that the sensitive surface is spread on a rotating drum, that the optical head is mounted adjacent to said drum and arranged to move along a generating line of said drum according to the X axis, the rotation of the drum allowing the moving of the photosensitive surface according to the Y axis.

13. The device of claim 1 further characterized by the fact that the sensitive surface is spread in a plane and that the optical head is arranged to moved adjacent to that plane according the two X and Y directions.

14. The device of claim 1 further characterized by the fact that said sensitive surface is spread in a plane and that said optical head is arranged to move adjacent to said plane allowing the positionning in the X axis, the table being movable perpendicularly and allowing the positioning in the Y axis.

15. The device of claim 1 further characterized by the fact that the objective is selected as to allow a projection of the symbols between two limits, namely continuously from about 0.5 to about 1.5 times the size of said symbols.

16. The device of claim 1 further characterized by the fact that the means of the moving between the optical head and the sensitive surface are arranged so that the distance between the lamp of the head and the sensitive surface is a fixed and predeterminated distance, the luminous path starting from the lamp and going through the disc and the objective to strick the sensitive surface being a straight line.

* * * * *